UNITED STATES PATENT OFFICE.

WILHELM HERZBERG AND HEINRICH HEIMANN, OF BERLIN, GERMANY, ASSIGNORS TO THE ACTIEN-GESELLSCHAFT FÜR ANILIN FABRIKATION, OF SAME PLACE.

RED DYE OF ROSINDULIN SERIES.

SPECIFICATION forming part of Letters Patent No. 567,473, dated September 8, 1896.

Application filed May 23, 1896. Serial No. 592,825. (Specimens.)

*To all whom it may concern:*

Be it known that we, WILHELM HERZBERG and HEINRICH HEIMANN, of Berlin, in the Kingdom of Prussia, German Empire, have invented new and useful Improvements in the Manufacture of Red Dye; and we do hereby declare that the following is a full, clear, and exact description of the invention, which will enable others skilled in the art to which it appertains to make and use the same.

The invention relates to the production of a valuable red coloring-matter of the rosindulin series, possessing the formula $C_{28}H_{17}N_3S_3O_9Na_2$, and is based on the following observations: We have discovered that by heating equimolecular proportions of alpha-naphthylamin and orthoamidodiphenylamin-monosulfonic acid with oxidizing agents a monosulfonic acid of rosindulin of the formula $C_{22}H_{14}N_3SO_3$ is formed. By the action of anilin upon this acid we have converted the same into a monosulfonic acid of phenylrosindulin of the formula $C_{28}H_{19}N_3SO_3$, a reaction which hitherto has not yet been performed in the rosindulin series. By finally heating the aforesaid monosulfonic acid of phenylrosindulin with fuming sulfuric acid we have transformed it into a trisulfonic acid of the formula $C_{28}H_{19}N_3S_3O_9$, which has been found to be a most valuable dyestuff, producing on wool clear red shades of bluish tint distinguished by their fastness to light and alkalies.

For practically carrying out our invention we may proceed as follows: 14.3 kilograms of alphanaphthylamin and 26.5 kilograms of orthoamidodiphenylamin-sulfonic acid are dissolved in water and hydrochloric acid or acetic acid. To the mixture the aqueous solution of twenty kilograms of bichromate of soda is slowly added. The rosindulin-sulfonic acid thus formed precipitates as a brown crystalline powder with a metallic luster, sparingly soluble in water. Ten kilograms of this rosindulin-sulfonic acid, thirty kilograms of anilin, and five kilograms of hydrochlorate of anilin are heated to from 165° to 170° centigrade for about two hours. The phenylated rosindulin-sulfonic acid separates as a green crystalline powder of metallic luster. The excess of anilin is removed in the usual way by means of steam or of diluted acids. The phenylrosindulin-sulfonic acid obtained is scarcely soluble in water. Its soda salt sparingly dissolves in cold water, more readily in hot water. Ten kilograms of this acid are introduced while stirring into about thirty kilograms of fuming sulfuric acid of thirty-two per cent. of anhydrid at from 30° to 35° centigrade. Then the mixture is heated to from 65° to 70° centigrade for about four hours. After cooling the mixture is allowed to flow upon ice, about two or three times the quantity of the sulfuric acid. The sulfonic acid precipitated is separated by filtration and converted into its soda salt, from the solution of which the dyestuff is isolated by precipitation with common salt.

The dyestuff is a phenylrosindulin-trisulfonic acid of the formula $C_{28}H_{19}N_3S_3O_9$, as has been stated by the analysis of the acid barium salt: 0.332 gram of the substance dried at 110° centigrade yielded 0.0972 gram barium sulfate, equal to 17.2 per cent. barium. Calculated for $C_{28}H_{16}N_3SO_3H(SO_3)_2Ba$, 17.7 per cent. barium.

The acid is readily soluble in water, practically insoluble in alcohol and is distinguished by the capability of forming acid salts which possess very characteristic properties.

The disoda salt of the formula $$C_{28}H_{16}N_3SO_3H(SO_3Na)_2$$

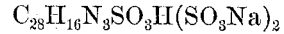

is sparingly soluble in cold water, but dissolves easily on heating. It crystallizes in beautiful brown lamellæ. By means of common salt it is entirely precipitated from its aqueous solution. It is insoluble in alcohol.

The acid barium salt mentioned before is entirely insoluble in cold water and nearly insoluble in hot water. Moreover, the acid lime salt of the formula $C_{28}H_{16}N_3SO_3H_2(SO_3)_2Ca$, which is almost insoluble in water, is very characteristic for our new acid. By these properties the above-described acid is distinguished from the phenylrosindulin-trisulfonic acid mentioned in the English Patent No. 19,167, of 1890, and in the German Patent No. 67,198, and from the polysulfonic acid, which probably is or contains a trisulfonic acid, described in the United States Letters Patent No. 431,404.

The following alterations may be made in the above example without materially changing the character of the product obtained: Instead of orthoamidodiphenylamin-sulfonic acid, its homologues, orthoamidophenyl-para-tolylamin-sulfonic acid or orthoamidophenyl-meta-xylylamin-sulfonic acid, may be used; further, for anilin ortho or para toluidin may be substituted.

Having now described our invention, what we claim is—

The hereinbefore-described dye, being the disoda salt of the phenylrosindulin-trisulfonic acid derived from alpha-naphthylamin and orthoamidodiphenylamin-sulfonic acid by joint oxidation, subsequent phenylation and sulfonation by means of fuming sulfuric acid, which dye possesses the formula $C_{28}H_{16}N_3SO_3H(SO_3Na)_2$ and crystallizes in brown lamellæ insoluble in alcohol, sparingly soluble in cold water, easily in hot water, from which solution it is entirely precipitated by means of common salt; said dye producing on wool clear red shades of a bluish tint; the aforesaid phenylrosindulin-trisulfonic acid itself being readily soluble in water, practically insoluble in alcohol and forming nearly insoluble barium and lime salts.

In testimony whereof we hereunto set our hands and affix our seals, in the presence of two witnesses, this 7th day of May, A. D. 1896.

WILHELM HERZBERG. [L. S.]
HEINRICH HEIMANN. [L. S.]

Witnesses:
WALTER KARFTEN,
GUSTAV LUCHT.